United States Patent
Fasano et al.

(10) Patent No.: US 12,024,314 B2
(45) Date of Patent: Jul. 2, 2024

(54) END-TO-END ON-ORBIT SERVICING

(71) Applicant: Thales Alenia Space Italia S.p.A. Con Unico Socio, Rome (IT)

(72) Inventors: Giorgio Fasano, Turin (IT); Enrico Gaia, Turin (IT); Stefano Ferroni, Turin (IT); Mario Pessana, Turin (IT)

(73) Assignee: Thales Alenia Space Italia S.p.A. Con Unico Socio, Rome (IT)

( * ) Notice: Subject to any disclaimer, the term of this patent is extended or adjusted under 35 U.S.C. 154(b) by 150 days.

(21) Appl. No.: 17/769,848

(22) PCT Filed: Oct. 19, 2020

(86) PCT No.: PCT/IB2020/059821
§ 371 (c)(1),
(2) Date: Apr. 18, 2022

(87) PCT Pub. No.: WO2021/074910
PCT Pub. Date: Apr. 22, 2021

(65) Prior Publication Data
US 2022/0402631 A1 Dec. 22, 2022

(30) Foreign Application Priority Data
Oct. 18, 2019 (IT) .......................... 102019000019322

(51) Int. Cl.
*B64G 1/10* (2006.01)
*B64G 1/24* (2006.01)
(Continued)

(52) U.S. Cl.
CPC ........... *B64G 1/1078* (2013.01); *B64G 1/244* (2019.05); *B64G 1/26* (2013.01); *B64G 1/646* (2013.01); *B64G 1/245* (2023.08)

(58) Field of Classification Search
CPC ........ B64G 1/1078; B64G 1/244; B64G 1/26; B64G 1/646; B64G 1/245
See application file for complete search history.

(56) References Cited

U.S. PATENT DOCUMENTS 4,880,187 A * 11/1989 Rourke .................. B64G 1/646
244/171.1
4,890,918 A * 1/1990 Monford .............. G01B 11/272
356/399
(Continued)

FOREIGN PATENT DOCUMENTS

| CN | 109625333 A | 4/2019 |
|----|-------------|--------|
| CN | 110110342 A | 8/2019 |

OTHER PUBLICATIONS

James, Adaptive Control for Post-Dock Maneuvers with an Unknown Semi-Cooperative Object, 2016 IEE Aerospace Conference, IEEE, Mar. 5, 2016, pp. 1-10.
(Continued)

*Primary Examiner* — Medhat Badawi
(74) *Attorney, Agent, or Firm* — McCarter & English, LLP

(57) ABSTRACT

An on-orbit servicing spacecraft includes an engagement system to engage a space vehicle or object to be serviced or tugged, so as to form a space system, and an electronic reaction control system to cause the spacecraft to rotate about roll, yaw, and pitch axes to control attitude and displacement along given trajectories to cause the spacecraft to carry out given maneuvers. The electronic reaction control system includes (i) a sensory system to directly sense physical quantities or allow physical quantities to be indirectly computed based on sensed physical quantities, including one or more of position, attitude, angular rates, available fuel, geometrical features, and on-board systems state, (ii) attitude control thrusters mounted so as to allow their (Continued)

positions and orientations to be adjustable, and (iii) an attitude control computer in communication with the sensory system and the attitude control thrusters and programmed to receive data from the sensory system and to control, based on the received data, positions, orientations, and operating states of the attitude control thrusters so as to control attitude and position of the spacecraft. The attitude control computer is programmed to cause the spacecraft to carry out a given mission including an engagement step, in which the engagement system and the attitude control thrusters are controlled by the attitude control computer to engage a space vehicle or object to be serviced or tugged, and one or more operating steps, in each of which the attitude control thrusters are controlled by the attitude control computer to meet one or more requirements established for the operating step.

10 Claims, 5 Drawing Sheets

(51) Int. Cl.
*B64G 1/26* (2006.01)
*B64G 1/64* (2006.01)

(56) References Cited

U.S. PATENT DOCUMENTS

| | | | | |
|---|---|---|---|---|
| 4,964,596 | A * | 10/1990 | Ganssle | B64G 1/646 244/173.3 |
| 5,242,135 | A * | 9/1993 | Scott | B64G 1/2427 244/164 |
| 5,258,764 | A * | 11/1993 | Malinowski | H01Q 3/14 342/359 |
| 5,299,764 | A * | 4/1994 | Scott | B64G 1/1078 244/172.5 |
| 5,302,816 | A * | 4/1994 | Tulet | G01S 17/875 244/172.4 |
| 5,340,060 | A * | 8/1994 | Shindo | B64G 1/244 244/172.4 |
| 5,372,340 | A * | 12/1994 | Ihara | B64G 4/00 244/172.5 |
| 5,511,748 | A * | 4/1996 | Scott | B64G 1/1078 244/172.5 |
| 5,692,707 | A * | 12/1997 | Smay | B64G 1/281 244/165 |
| 5,803,407 | A * | 9/1998 | Scott | B64G 1/242 244/164 |
| 5,806,802 | A * | 9/1998 | Scott | B64G 1/242 701/13 |
| 6,017,000 | A * | 1/2000 | Scott | B64G 1/24 244/158.6 |
| 6,128,555 | A * | 10/2000 | Hanson | G05B 9/02 714/6.32 |
| 6,311,931 | B1 * | 11/2001 | Smay | B64G 1/285 244/164 |
| 6,484,973 | B1 * | 11/2002 | Scott | B64G 1/646 701/13 |
| 7,370,834 | B2 * | 5/2008 | Scott | B64G 1/2427 244/164 |
| 7,575,200 | B2 * | 8/2009 | Behrens | B64G 1/646 244/172.3 |
| 9,115,662 | B1 | 8/2015 | Claggett et al. | |
| 9,909,574 | B1 * | 3/2018 | Heimanowski | F02K 9/62 |
| 10,611,504 | B2 * | 4/2020 | Halsband | B64G 1/242 |
| 10,625,882 | B2 * | 4/2020 | Reitman | B64G 4/00 |
| 10,850,869 | B2 * | 12/2020 | Nicholson | B64G 1/2427 |
| 11,542,040 | B1 * | 1/2023 | Hemmati | B64G 3/00 |
| 11,554,885 | B1 * | 1/2023 | Green | B64G 1/646 |
| 11,623,760 | B2 * | 4/2023 | Bosma | B64D 39/06 244/195 |
| 11,738,891 | B1 * | 8/2023 | Dorais | B64G 1/646 244/171.1 |
| 11,760,509 | B1 * | 9/2023 | Hausgen | B64G 1/26 701/531 |
| 2003/0093194 | A1 * | 5/2003 | Li | B64G 1/36 701/13 |
| 2004/0026571 | A1 * | 2/2004 | Scott | B64G 1/2427 244/172.5 |
| 2004/0113020 | A1 * | 6/2004 | Wang | B64G 1/285 244/165 |
| 2004/0117074 | A1 * | 6/2004 | Wang | B64G 1/285 701/13 |
| 2005/0113986 | A1 * | 5/2005 | Prakash | B64G 1/38 701/13 |
| 2005/0151022 | A1 * | 7/2005 | D'Ausilio | B64G 1/422 244/171.1 |
| 2005/0258311 | A1 * | 11/2005 | Scott | B64G 1/1078 244/172.4 |
| 2007/0049195 | A1 * | 3/2007 | Chun | H04B 7/18519 455/3.02 |
| 2007/0235592 | A1 * | 10/2007 | Horn | B64G 1/645 244/158.1 |
| 2017/0259946 | A1 * | 9/2017 | White, Jr. | B64G 1/405 |
| 2018/0148197 | A1 | 5/2018 | Halsband et al. | |
| 2020/0294772 | A1 * | 9/2020 | Hummelt | B64G 1/405 |
| 2021/0262455 | A1 * | 8/2021 | Hummelt | B64G 1/26 |
| 2021/0300597 | A1 * | 9/2021 | Clark | B64G 1/402 |
| 2022/0017241 | A1 * | 1/2022 | Ferroni | B64G 1/543 |
| 2022/0234764 | A1 * | 7/2022 | Ishigame | B64G 1/66 |
| 2022/0254061 | A1 * | 8/2022 | Bresciani | G06V 10/147 |
| 2022/0380066 | A1 * | 12/2022 | Yang | B64G 1/645 |
| 2022/0390605 | A1 * | 12/2022 | Gigleux | B64G 1/1078 |
| 2022/0402631 | A1 * | 12/2022 | Fasano | B64G 1/26 |
| 2023/0271726 | A1 * | 8/2023 | Harang | B64G 1/64 701/13 |
| 2023/0271727 | A1 * | 8/2023 | Reis | B64G 1/244 701/13 |
| 2023/0278729 | A1 * | 9/2023 | Hess | B64G 1/646 244/172.4 |
| 2023/0286671 | A1 * | 9/2023 | Yunitski | B64G 1/1085 244/158.8 |
| 2023/0286677 | A1 * | 9/2023 | Denham | H01F 7/0252 244/172.4 |
| 2023/0288003 | A1 * | 9/2023 | Ferroni | F16L 37/107 251/149.6 |
| 2023/0331402 | A1 * | 10/2023 | Barrington-Brown | B64G 1/28 |
| 2023/0356861 | A1 * | 11/2023 | Wilson | B64G 1/26 |

OTHER PUBLICATIONS

PCT International Search Report and Written Opinion dated Feb. 25, 2020 for PCT Application No. PCT/IB2020/059821.

* cited by examiner

END-TO-END ON-ORBIT SERVICING

CROSS-REFERENCE TO RELATED APPLICATIONS

This patent application is a 35 U.S.C. § 371 National Stage filing of International Application No. PCT/M2020/059821, filed on Oct. 19, 2020, which patent application claims priority to Italian patent application No. 102019000019322 filed on Oct. 18, 2019, the entire content of which is herein incorporated by reference.

TECHNICAL FIELD

The present invention relates in general to end-to-end on-orbit servicing, and in particular to on-orbit servicing spacecrafts for on-orbit inspection and/or maintenance of spacecrafts and for tugging space vehicles or other space objects.

BACKGROUND OF THE INVENTION

As is known, in the space landscape, end-to-end on-orbit servicing services are revolutionizing space transport and the way in which space is used.

Broadly speaking, end-to-end on-orbit servicing services can be classified into two broad categories: spacecraft inspection and/or maintenance services and tugging services for tugging space vehicles or space objects of other nature, for example space debris.

Spacecraft inspection and/or maintenance services may in turn be subdivided into spacecraft inspection services, spacecraft life-extension services, including refueling, spacecraft relocation services; and spacecraft update services to adapt the spacecraft's missions throughout their service life.

Spacecraft tugging services may in turn be subdivided into geostationary orbits spacecraft tugging services, including spacecraft delivery, and Low Earth Orbits (LEO) spacecraft tugging services, including satellite constellation deployment. These are supplied for example to satellites which, due to launch malfunctions, have failed to reach their operating orbits.

Tugging services or rather space objects removal services, on the other hand, essentially consist of the clean-up service aimed at actively removing space debris.

On-orbit servicing services are provided through on-orbit servicing spacecrafts, which are distinguished into inspection and/or maintenance spacecrafts, when they are designed to provide inspection and/or maintenance services to spacecrafts, and into space tugs, when they are designed to provide space vehicle/object tugging services.

The space object tugging service may also be provided to space objects that fails to be collaborative in the service provisioning, and the spacecraft inspection and/or maintenance services and the spacecraft tugging services are provided to spacecrafts that either can or cannot be collaborative during the service provisioning.

When they are used to provide spacecraft tugging services, spacecraft tugs can be coupled to spacecrafts to be tugged before being launched, directly into the launcher, so as to be launched together with the spacecrafts to be tugged, or they can be launched separately from the spacecrafts to be tugged into a so-called rendezvous orbit (LEO or NRHO—Near Rectilinear Halo Orbit) waiting for the spacecrafts to be tugged, which are launched into the rendezvous orbit after the space tugs.

When they are used to tug separately launched spacecrafts, spacecraft tugs are controlled so as to autonomously approach and dock he spacecrafts via appropriate docking systems, usually in the form of robotic arms, and to possibly propel the docked spacecrafts until they reach a desired orbit where the spacecrafts can operate or maintenance/refuelling, repair or other operations can be performed.

When they are used to tug space objects, space tugs are controlled so as to autonomously approach and capture space objects by means of appropriate capture systems such as nets, harpoons, or other systems, and to deorbit or raise the orbit of the captured space objects, varying simply their orbit in order to bring them where they can no longer be a risk for operating satellites.

US 2018/148197 A1 discloses a service satellite having a body, a controller, and a docking unit. The docking unit comprises at least two foldable and adjustable gripping arms pivotally mounted on the satellite body. Each gripping arm is pivotable relative to the satellite body, and comprises a gripping end at each free end of the gripping arms. The gripping ends are adapted and configured to capture and grip a target portion of an orbiting satellite. Each gripping arm is independently controllable by a controller, which coordinates the motion of the gripping arms. The service satellite further comprises a propulsion unit comprising a first thruster mounted adjacent a Nadir end of the service satellite body and a balance thruster spaced apart from the first thruster and facing a different direction than the first thruster, propellant for the thruster and the balance thruster. The service satellite further comprises means for aligning the thrusters so that a thrusting vector passes through a joint centre of gravity of the service satellite and the serviced satellite.

U.S. Pat. No. 6,017,000 A discloses apparatus and methods for performing satellite proximity operations such as inspection, recovery, and life extension of a target satellite through operation of a "Satellite Inspection Recovery and Extension" ("SIRE") spacecraft which can be operated in tele-operated, automatic and autonomous modes. The SIRE concept further consists of those methods and techniques used to perform certain on-orbit operations including, but not limited to, the inspection, servicing, recovery, and lifetime extension of satellites, spacecrafts, space systems, space platforms and other vehicles and objects in space, collectively defined as "target satellites". The three basic types of SIRE proximity missions are defined as "Life Extension", "Recovery", and "Utility". A remote cockpit system is provided to permit human control of the SIRE spacecraft during proximity operations.

James Jillian: "*Adaptive control for post-dock manoeuvres with an unknown semi-cooperative object*", 2016 IEEE Aerospace Conference, IEEE, 5 Mar. 2016 (2016-03-05), pages 1-10, explores the trade-space in which an adaptive controller can maintain attitude control authority when a spacecraft joins with an object with limited physical parameter information on, with the goal of charting a path for controller validation via future spaceflight experimentation. A comparison is made between a baseline attitude and position proportional-integral-derivative (PID) control system and an adaptive PID approach. The jointed spacecraft inertia, mass, and location of centre of mass are varied to assess the limitations, performance, and robustness of these controllers.

U.S. Pat. No. 9,115,662 B1 discloses methods and equipment for managing a plurality of thrusters in a platform, comprising operating the plurality of thrusters in the platform with a thruster control system, estimating a vehicle response resulting from the operation of the plurality of thrusters to form an estimated vehicle response, and comparing the estimated vehicle response to a desired vehicle response to develop objective functional errors.

CN 110 110 342 A discloses a combination spacecraft data driving control method based on a proximity algorithm. The method comprises the following steps: establishing a combination spacecraft motion model; designing a data driving attitude controller based on a proximity algorithm; initializing controller parameters and establishing a database; calculating the predicted value of the system by using a formula, and calculating the predicted output of the system by using the formula; a computing controller; updating the data in the database; and iterating in order to adjust the controller output.

CN 109 625 333 A discloses a space non-cooperative target capturing method based on deep enhancement learning. The method comprises two steps. Interaction can be achieved by the method. The method comprises the steps that one, a three-dimensional visualized environment for a service aerial vehicle and a target aerial vehicle is constructed using three-dimensional visualized software, inputs of the visualized environment are control force and control moment of the service aerial vehicle, and outputs are the states of the service aerial vehicle and the target aerial vehicle; two, a convolutional neural network model is constructed, and intelligent autonomous space non-cooperative target capturing training is conducted on the service aerial vehicle in the three-dimensional visualized environment. The states of the service aerial vehicle and the target aerial vehicle are taken as inputs of the convolutional neural network model, weight parameters of the convolutional neural network model are used to output control forces and momentums needed to control the service aerial vehicle, the control forces and momentums are sent to the visualized environment, and the states of the two aerial vehicles are input to the neural network continually to perform constant deep enhancement training.

OBJECT AND SUMMARY OF THE INVENTION

The Applicant has experienced that one of the key technological problems that servicing spacecrafts have to face in providing servicing services to client spacecrafts, in particular satellites, is to optimise, i.e., reduce, fuel consumption to guarantee an appropriate attitude, especially when docked to client satellites, a situation in which the centre of mass of an aggregate spacecraft is placed in an intermediate position (generally unknown a priori) between the two spacecrafts.

Based on its best knowledge, the Applicant has found that the technologies currently used or proposed to address the above-mentioned technological problem are essentially based on the provision of attitude control thrusters moved, by means of suitable mechanisms, in two or more predetermined discrete positions, usually a stowed or undeployed position and a deployed position, in which, to the Applicant's best knowledge, the deployed positions are computed on the ground based on an estimate of the positions that can be assumed by the centre of mass of the aggregate spacecraft in all possible missions predictable a priori the servicing spacecraft and the aggregate spacecraft must perform.

Resultingly, the Applicant has verified that the above-indicated technologies, albeit satisfactory in many aspects, have significant margins for improvement both in terms of efficiency of optimisation of fuel consumption of the servicing spacecrafts during their entire service life, especially where it is difficult to interact with the service spacecraft from the ground due to their distance from the Earth, and in terms of number and, consequently, total mass of the attitude control thrusters necessary to control attitude of the servicing spacecraft and the aggregate spacecraft through the entire service life of the servicing spacecraft.

Therefore, the present invention has the purpose of providing a technology that allows improvements to be obtained both in terms of efficiency of optimisation of fuel consumption and in terms of number of attitude control thrusters needed to control the attitude of the service spacecraft and of the aggregate spacecraft, also taking into account necessary redundancies.

According to the present invention, an on-orbit servicing spacecraft is provided, as claimed in the appended claims.

DETAILED DESCRIPTION OF POSSIBLE EMBODIMENTS OF THE INVENTION

Figure 1:
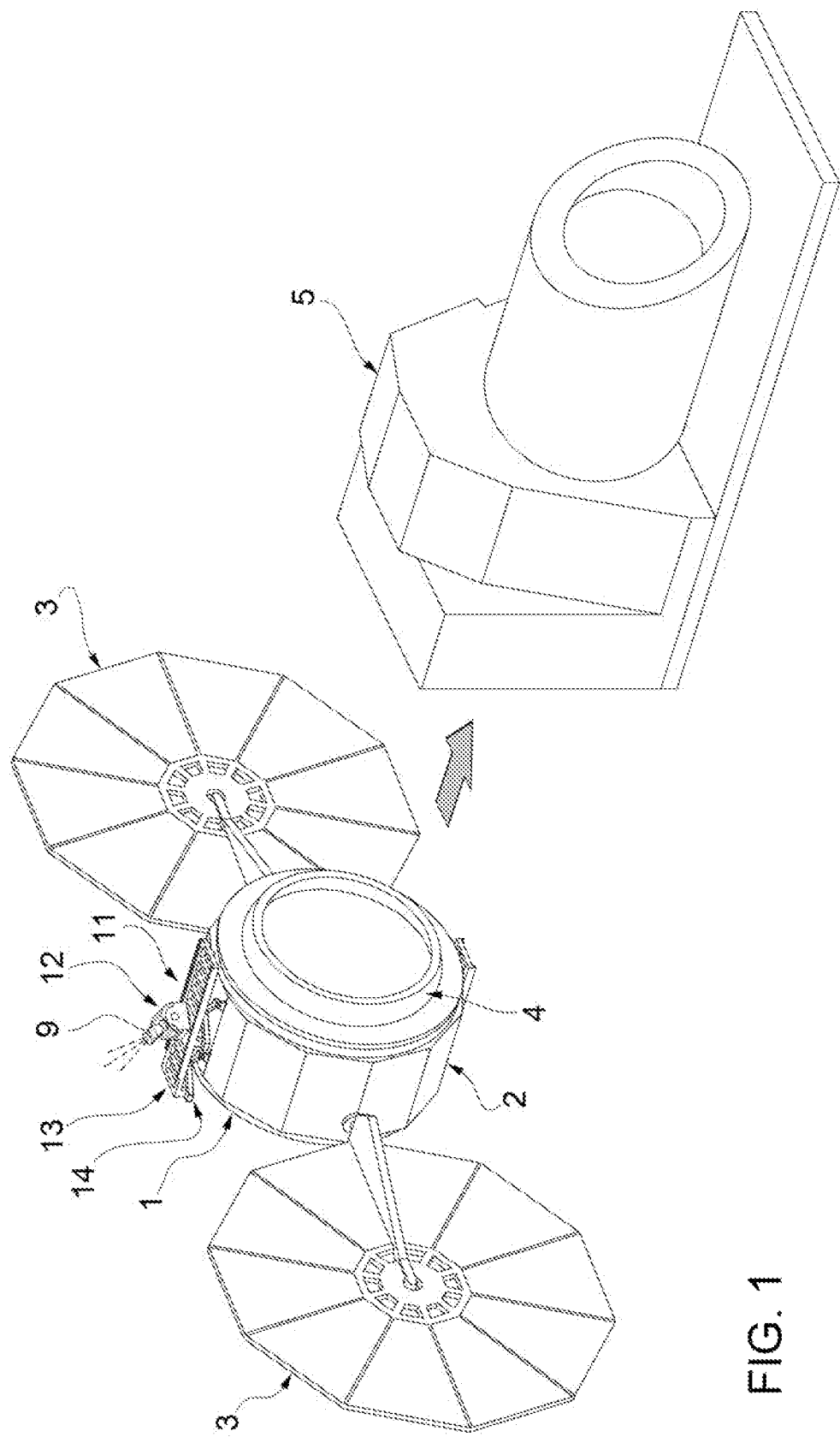
FIG. 1 shows an on-orbit servicing spacecraft.

The present invention will now be described in detail with reference to the attached figures to allow a person skilled in the art to make and use it. Various modifications to the embodiments described will be immediately apparent to those skilled in the art and the generic principles described can be applied to other embodiments and applications without thereby departing from the protective scope of the present invention, as defined in the attached claims. Therefore, the present invention should not be considered limited to the embodiments described and illustrated, but should be accorded the broadest scope of protection consistent with the described and claimed features.

Unless otherwise defined, all the technical and scientific terms used herein have the same meaning commonly used by persons of ordinary experience in the field pertaining to the present invention. In the event of any conflict, this description, including the definitions provided, shall be binding. Furthermore, the examples are provided for illustrative purposes only and as such should not be regarded as limiting.

In particular, the block diagrams included in the attached figures and described below are not intended as a representation of the structural features, i.e. constructive limitations, but they must be interpreted as a representation of functional features, i.e intrinsic properties of the devices defined by the effects obtained, that is functional limitations and that can be implemented in different ways, therefore in order to protect the functionality thereof (possibility of functioning).

In order to facilitate the understanding of the embodiments described herein, reference will be made to some specific embodiments and a specific language will be used for the description thereof. The terminology used herein has the purpose of describing only particular embodiments, and is not intended to limit the scope of the present invention.

Furthermore, for descriptive convenience, the following description will refer, without thereby losing generality, to a mission in which an on-orbit servicing spacecraft in the form of a space tug must dock a spacecraft in the form of a satellite (not necessarily collaborative), thus forming a rigid space system consisting of the space tug and of the satellite rigidly engaged to each other.

Broadly speaking, the idea underlying the present invention is essentially providing an Artificial Intelligence (AI)-based attitude control capable of outputting, based on the information provided by a sensory system of the space tug, the best solution with regard to positioning, orientation, and operation of the attitude control thrusters of the space tug, both when it engages the satellite or when it is still separated from the satellite.

The Artificial Intelligence-based attitude control is also designed to adapt to changes over time, such as, for example, a displacement of the position of the centre of mass of the space system due to a progressive fuel consumption on the space system.

In this way, it is possible, on the one hand, to reduce fuel consumption and it is possible, on the other hand, to reduce the total number (including redundancies) of necessary attitude control thrusters, consequently reducing the weight of the attitude control system while also providing a greater capability of absorbing any failure of the attitude control thrusters and increasing the manoeuvring flexibility of the space system.

Figure 2:
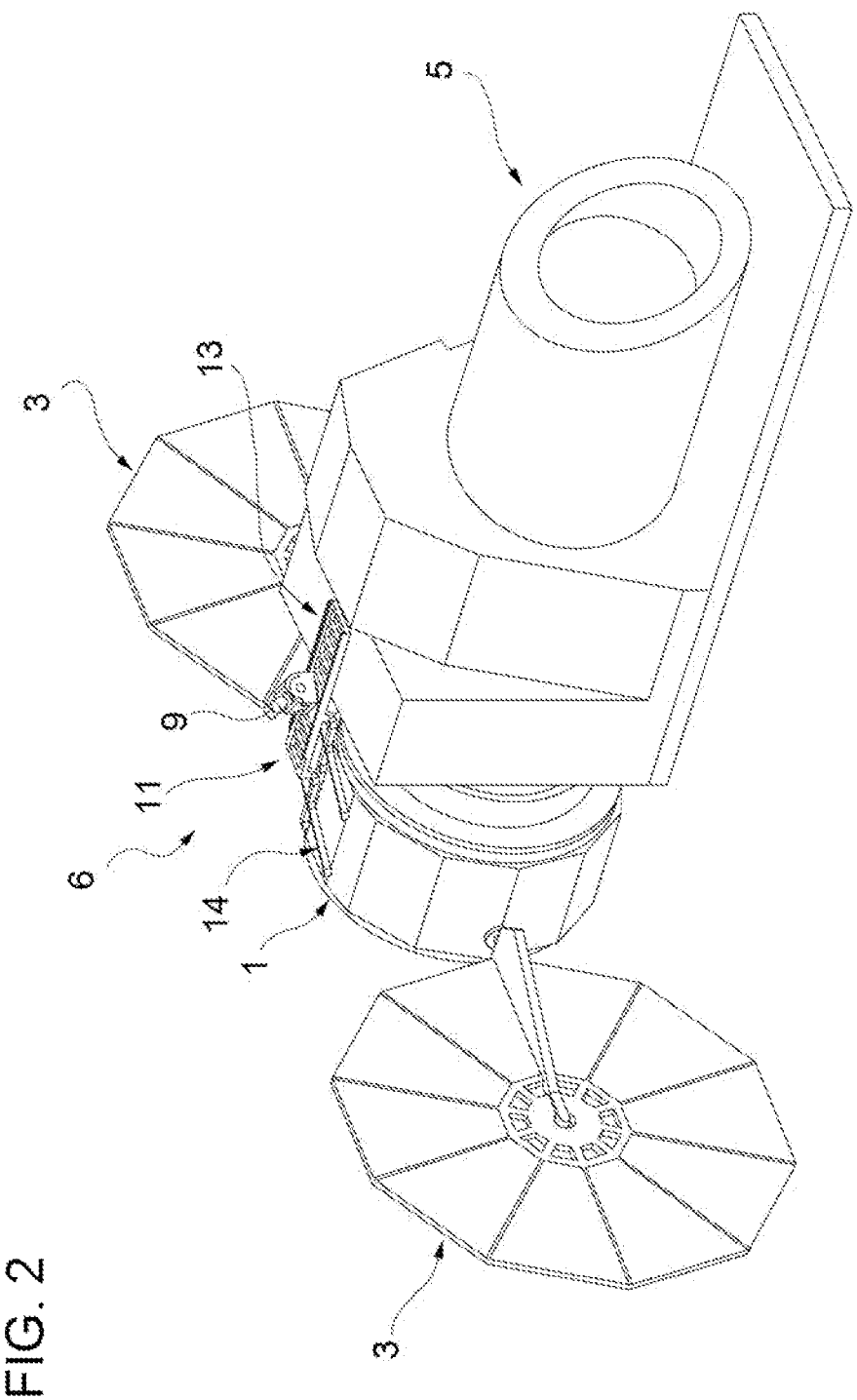
FIG. 2 shows a space system formed by the on-orbit servicing spacecraft of FIG. 1 docked to a spacecraft to be serviced or tugged.
Figure 3:
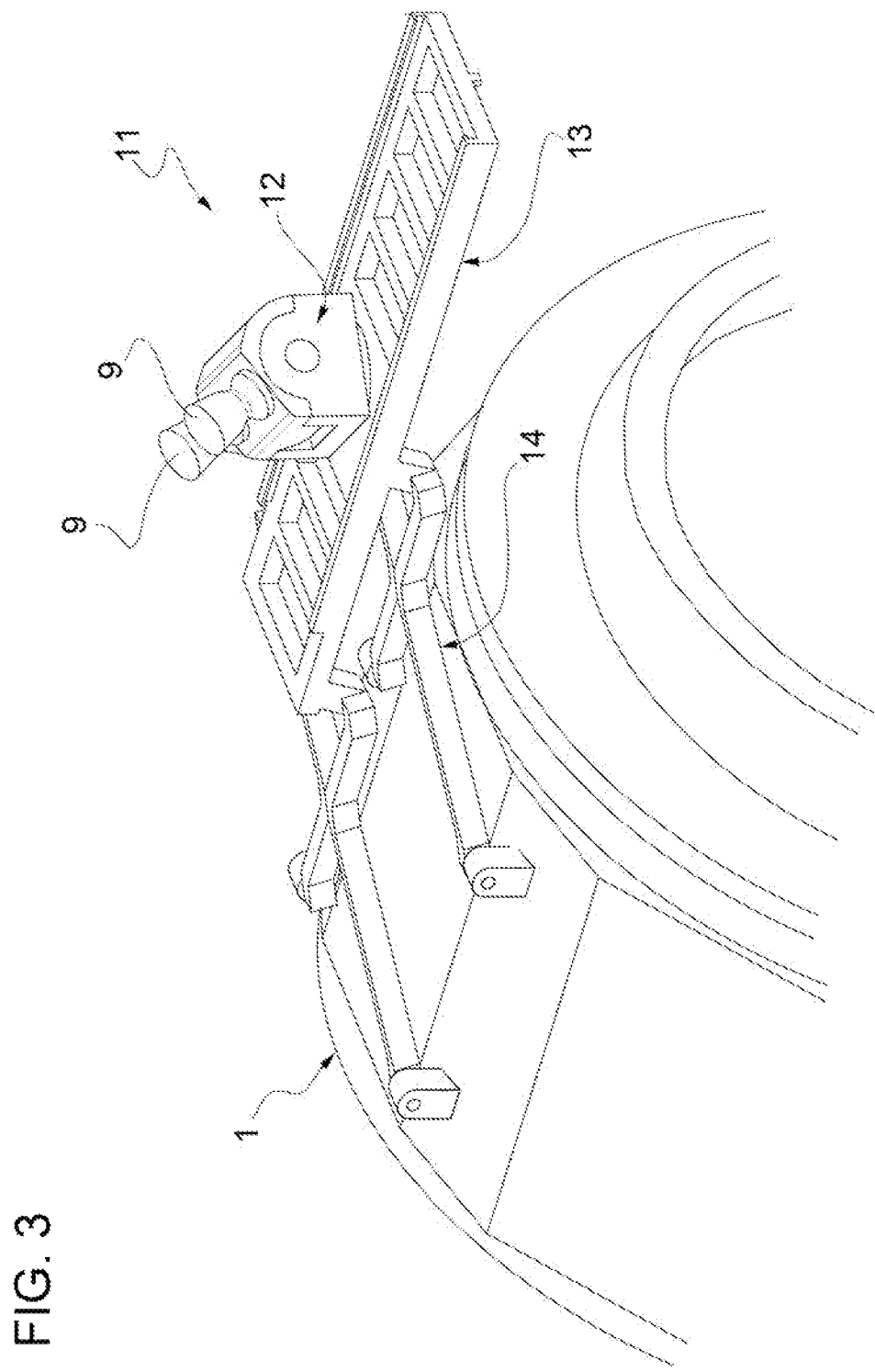
FIG. 3 shows a positioning and orientation system of attitude control thrusters of the on-orbit servicing spacecraft of FIG. 1.

FIGS. 1, 2, and 3 show a space tug according to the present invention, referenced as a whole with reference numeral 1.

The space tug 1 comprises:
- a body or structure or platform 2; and
- on-board equipment carried by body 2 and comprising, among others:
  - solar panels 3 to electrically power on-board electrical systems;
  - an electronically-controllable engagement system 4 of a known type and, hence, not described in detail and illustrated by way of example in the form of a ring on which engagement mechanisms according to the prior art (not illustrated) are fixed, to dock/capture a tugged satellite 5, so forming a space system 6 therewith; and
  - an electronic reaction control system (RCS) 7 (FIG. 4) to cause the space tug 1 to rotate about roll, yaw, and pitch axes to control attitude and displacement thereof along given trajectories to cause the spacecraft 1 to carry out given manoeuvres such as rendezvous and docking manoeuvres between spacecrafts (using displacement control to control the speed of approach to the target and align with the docking point) and orbit variation manoeuvres.

Figure 4:
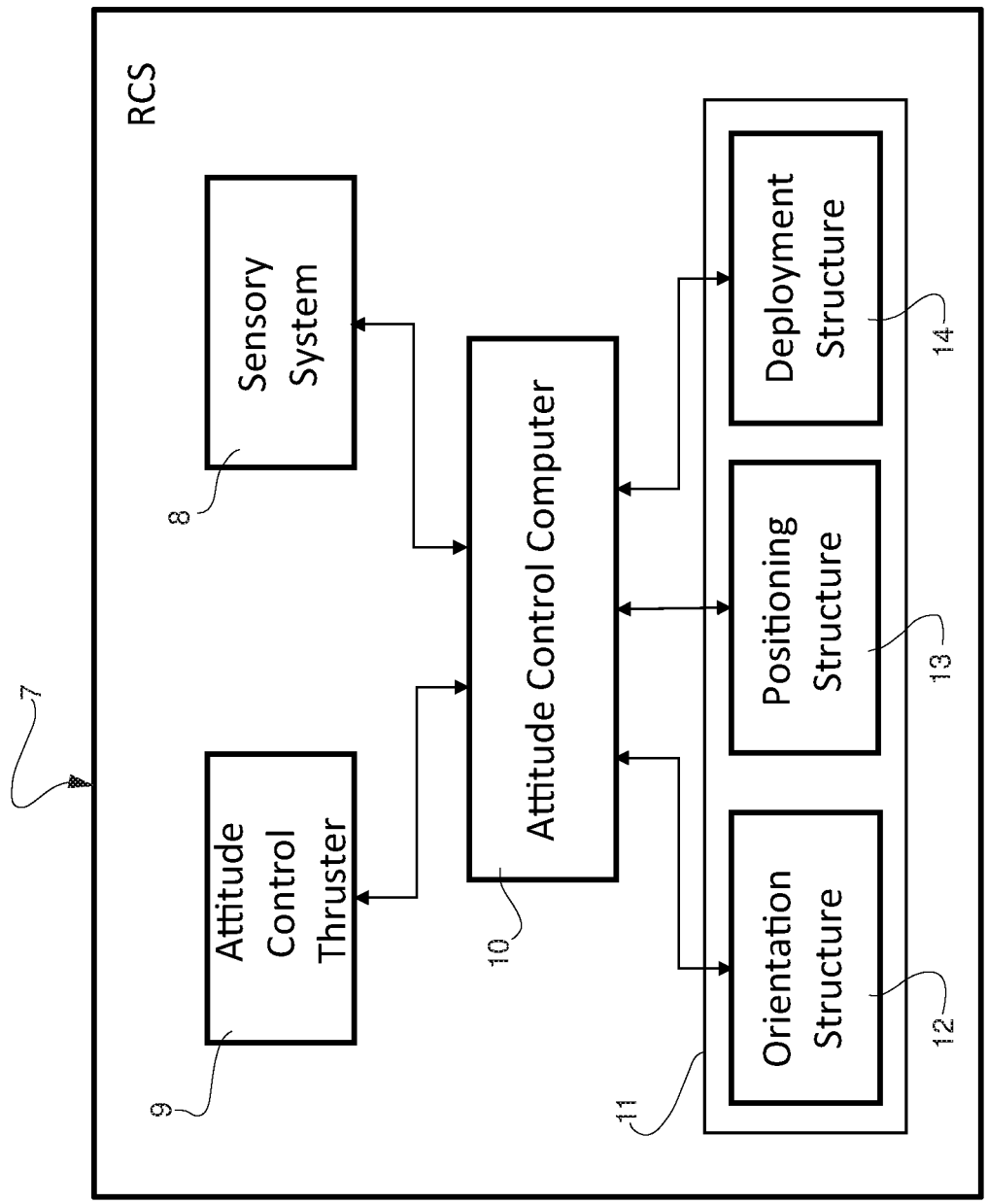
FIG. 4 shows a block diagram of an electronic reaction control system of the on-orbit servicing spacecraft of FIG. 1.

As shown in the block diagram of FIG. 4, the electronic reaction control system 7 comprises:
- a sensory system 8 of a known type and, hence, not described in detail, to allow physical quantities to be directly sensed or indirectly computed based on sensed physical quantities such as position, attitude, angular rates, available fuel, geometrical features, and on-board system state;
- electronically-controllable actuators/motors in the form of attitude control thrusters 9 mounted so as to allow their positions and orientations to be adjustable; and
- an attitude control computer 10 in communication with the sensory system 8 and the attitude control thrusters 9 and programmed to receive data from the sensory system 8 and to control, based on the received data, positions, orientations, and operating states of the attitude control thrusters 9 so as to control attitude and position of the space tug 1.

Referring again to FIGS. 1, 2 and 3, in order to allow their position and orientation to be adjustable, the attitude control thrusters 9 are mounted on the body 2 of the space tug 1 via an electronically-controllable deployable movement system 11 designed to allow position and orientation of the attitude control thrusters 9 to be adjustable in response to electrical commands from the attitude control computer 10.

As shown in greater detail in FIG. 2 by way of non-limiting example, the movement system 11 comprises, for each individual attitude control thruster 9, the orientation of which is to be individually adjusted or each group of attitude control thrusters 9 the orientation of which is to be collectively adjusted, hereinafter referred to as RCS cluster 9 for brevity's sake, an electronically-controllable orientation structure 12 designed to support the RCS cluster 9 to allow it to rotate about at least two orthogonal rotation axes A, B in response to electrical commands from the attitude control computer 10, so as to allow the orientation of the RCS cluster 9 to be adjustable on the space tug 1 as desired.

The movement system 11 further comprises, for each individual orientation structure 12 the position of which is desired to be individually adjustable or group of orientation structures 12 the position of which is desired to be collectively adjustable, an electronically-controllable positioning structure 13 designed to support the orientation structure 12 or the group of orientation structures 12 so as to allow them to displace along a rectilinear or curvilinear displacement direction, so as to allow their positions to be adjustable on the space tug 1.

FIGS. 1, 2, and 3 show by way of example a positioning structure 13 of a guide-slide type, in which an orientation structure 12 is anchored on a slide slidably mounted on a rectilinear guide, so as to displace along a rectilinear direction C in response to electrical commands from the attitude control computer 10, thus allowing the position of the RCS cluster 9 carried by the orientation structure 12 to be adjusted.

In the end, the movement system 11 further comprises, for each positioning structure 13, an electronically-controllable deployment structure 14, which connects the positioning structure 13 to the body 2 of the space tug 1 and is designed to assume, in response to electrical commands from the attitude control computer 10, an undeployed configuration, in which the positioning structure 13 is retained close to the body 2, and a deployed configuration relative to the body 2, in which the positioning structure 13 is moved away from the body 2 and brought in a position close to the satellite 5.

FIGS. 1, 2 and 3 show by way of example a deployment structure 14 of the type with levers hinged between the body 2 and the rectilinear guide of the positioning structure 13.

In the example shown in FIGS. 1, 2, and 3, the movement system 11 is formed by two movement sub-systems with identical architectures and each formed by an orientation structure 12 carrying an RCS cluster 9 with two attitude control thrusters 9, a positioning structure 13 carrying a single orientation structure 12, and a deployment structure 14 between the positioning structure 13 and the body 2 of the space tug 1.

The two movement sub-systems are symmetrically radially arranged on the body 2 so as to maintain a neutral behaviour with respect to the centre of mass of the space system and allow position and direction of the attitude control thrusters 9 to be fully managed in order to maximize efficiency of the resulting thrust.

Figure 5:
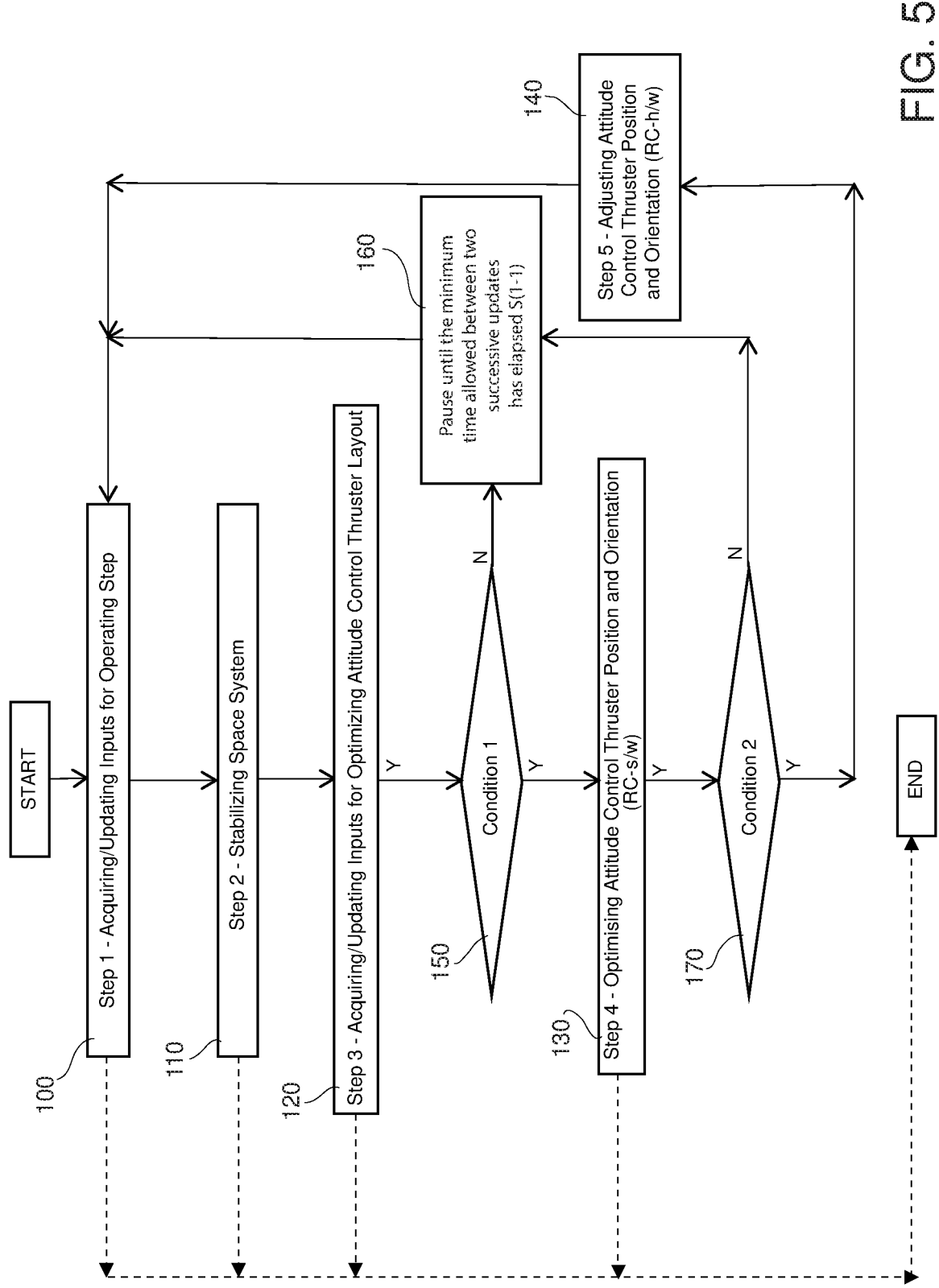
FIG. 5 shows a flowchart of the operations performed by an attitude control computer of the electronic reaction control system of FIG. 4.

FIG. 5 shows a flowchart of operations implemented by the attitude control computer 8 to control position, orientation, and operating state of the attitude control thrusters 9 to adjust and maintain attitude of the space tug 1 and vary the orbit thereof.

For this purpose, a mission of the space tug 1, which is known a priori, is conceptually divisible into operating steps comprising a preliminary step of docking the satellite 5 to be tugged, followed by one or more operating steps for accomplishing the mission objective, for example maintenance of a pre-assigned pointing of the satellite 5, possibly interspersed, depending on the specific mission, by steps of orbit transfer and attitude stabilisation.

The attitude control computer 10 is programmed both to perform the mission assigned to the space tug 1 and to optimise the medium-long term operating steps, assuming that the orbit transfer steps are optimised based on criteria established a priori, depending on the specific mission, or during the mission, for example using one or different dedicated neural networks, suitably trained on the ground.

Since the extension to more complex scenarios is immediate, for simplicity's sake the description below is based on the assumption that the mission of the space tug 1 consists exclusively of a preliminary step of docking/capturing the satellite 5 and a single operating step subsequent to the preliminary step. It is also assumed that as soon as the space tug 1 has docked or captured the satellite 5, the space system 6 that is so formed behaves like a rigid body, thus allowing a reference system, known a priori, integral with the space system 6 to be considered for controlling of the space system 6.

The operating step comprises, in the first place, stabilising the attitude of the space system 6 in compliance with the mission requirements, for example pointing, and with the chosen optimisation criterion, for example fuel consumption minimisation, pointing errors, etc. For descriptive convenience, herein after the acronym FS will be used to refer to an attitude stabilisation sub-step, and the acronym FR will be used to refer to a steady operating sub-step, which starts when the attitude stabilisation sub-step ends, i.e., when the stabilisation of the space system 6 has been reached, and which is maintained by the attitude control computer 10 for the entire duration of the sub-step FR by carrying out attitude control steps of a known type and, hence, not described in detail.

According to an aspect of the present invention, implementation of the sub-step FS is controlled by the attitude control computer 10 based on a neural network previously trained on the ground. For this purpose it is possible to adopt already available technology, for example that described in CN 109625333 A, which concerns the stabilisation of the space system 6, without however contemplating further objectives, such as minimising fuel consumption. In the sub-step FS the attitude control thrusters 9 are positioned and oriented according to a default configuration, established a priori.

In the scenario considered, exploitation of a neural network can be particularly advantageous, as an alternative to traditional control methods, because both the centre of mass of the space system 6 and the relative moments of inertia are not known a priori.

During the sub-step FS, the neural network is designed to effectively solve a standard control problem that can be described mathematically as follows:

$$\min_{t_0, t_f, u} \left\{ \Phi[t_0, x(t_0), t_f, x(t_f)] + \int_{t_0}^{t_f} L[x(t), u(t), t] dt \right\} \quad (1)$$

$$\dot{x}(t) = f(\dot{x}(t), u(t), t) \quad (2)$$

$$g(x(t), u(t), t) \leq 0 \quad (3)$$

$$\varphi[t_0, x(t_0), t_f, x(t_f)] = 0 \quad (4)$$

where expression (1) is the optimisation target, for example the fuel consumption minimisation, pointing errors, etc.; vector equation (2) is a representation of the dynamic state x(t) of the space system 6 considered (position and angular rate relative assigned reference systems), at each instant of time t, as a function of its time derivative $\dot{x}(t)$ (angular speed and acceleration of the space system 6), as well as of the control vector u(t), formed by the forces and torques exerted overall on the space system 6, at any instant of time t.

Expressions (3) and (4) respectively define the constraints on the state/control variables, as well as on the initial and final states (if necessary) of space system 6, at times $t_0$ and $t_f$.

The solution of the problem defined by the equations (1)-(4) outputted by the neural network is optimised with respect to the assigned (default) configuration of the attitude control thrusters 9. However, since, according to the present invention, the configuration of the attitude control thrusters 9 is adjustable, parameters of the space system 6, namely positions and orientations of the attitude control thrusters 9, are in turn considered in terms of additional (albeit time-independent) control variables. In this way, the range of the solutions is extended, giving rise to the new optimisation problem that follows:

$$\min_{t_0, t_f, u, P, \gamma} \left\{ \Phi[t_0, x(t_0), t_f, x(t_f)] + \int_{t_0}^{t_f} L[x(t), u(t), P, \gamma, t] dt \right\} \quad (5)$$

$$\dot{x}(t) = f(\dot{x}(t), u(t), P, \gamma, t) \quad (6)$$

$$g(x(t), u(t), P, \gamma, t) \leq 0 \quad (7)$$

$$\varphi[t_0, x(t_0), t_f, x(t_f)] = 0 \quad (8)$$

where the vectors P and γ (implicit in the formulation (1)-(4)) represent, respectively, positions and orientations of the attitude control thrusters 9 (no longer considered constants, but structural parameters of the space system 6 that can be defined in the context of corresponding domains, expressed by conditions (7)). The optimisation problem defined by (1)-(4) will be indicated herein after as "reduced optimisation problem" (PR), while the one defined by (5)-(8) as "extended optimisation problem" (PE).

The optimal solutions of the extended optimisation problem PE, in general, regardless of the specific target function chosen, are better than the optimal ones of the reduced optimisation problem PR. In formulas:

$$\min_{t_0, t_f, u, P, \gamma} \left\{ \Phi[t_0, x(t_0), t_f, x(t_f)] + \int_{t_0}^{t_f} L[x(t), u(t), P, \gamma, t] dt \right\} \leq$$

-continued $$\min_{t_0, t_f, u} \left\{ \Phi[t_0, x(t_0), t_f, x(t_f)] + \int_{t_0}^{t_f} L[x(t), u(t), t] dt \right\}$$

Since the spacecraft 1 is equipped with a movement system 11 to mode the attitude control thrusters 9, the attitude control computer 10 is programmed to compute for each attitude control thruster 9, after docking, admissible positions and orientations (domains of P and γ in the extended optimisation problem PE).

It's also worth noting that the tout court solution of the extended optimisation problem PE is significantly more complex than that of the reduced optimisation problem PR. Simultaneously optimising both the stabilisation of the space system 6 and the configuration of the attitude control thrusters 9 would hence be unrealistic, and for this reason, a sub-step of reconfiguring (RC) the attitude control thrusters 9 is introduced and an iterative process for optimising the configuration of the attitude control thrusters 9 shown in the flow diagram of FIG. 4 is proposed and described below.

As shown in FIG. 4, the process for optimising the configuration of the attitude control thrusters 9 essentially comprises the following operations, which will be described in detail below:
1. acquiring/updating inputs for the operating step; (block 100),
2. stabilising the space system 6 (block 110),
3. acquiring/updating inputs for the optimisation of the layout of the attitude control thrusters 9 (block 120),
4. optimising position and orientation of the attitude control thrusters 9 (block 130), and
5. (physically) adjusting position and orientation of the attitude control thrusters 9 (block 140).

Operations 1 to 5 are performed only in the operating step of the space system 6, hence, as shown in the flow diagram with a dashed line, exit of the space system 6 from the operating step causes an immediate abortion of execution of the step at that moment implemented (general stopping rule).

Operation 1

Acquiring/Updating Inputs for the Operating Step

Operation 1 is aimed at acquiring or, during the optimisation process, updating the operating scenario of the space system 6 in the operating step.

Operation 1 comprises performing the following steps:
1.1 acquisition/updating the requirements of the operating steps, for example maintenance of a given pointing angle of an on-board optical system of the satellite 5, and of the optimisation criterion, for example fuel consumption minimisation;
1.2 acquiring/updating the (available) data of the initial/current state of the space system 6, such as position, orientation, and angular speeds of the space system 6 in the reference system integral with the space system 6;
1.3 determining position and orientation of the satellite 5 relative to the space tug 1, so as to allow the geometric configuration of the space system 6 to be determined;
1.4 acquiring current positions and orientations of the attitude control thrusters 7 (at the initial step of the optimisation process, the design nominal/default ones).

For step 1.1, the requirements of the operating step and the optimisation criterion are known when the optimisation process is initiated. They may vary later, if the need for updates is identified, for example due to changes in conditions sensed by the sensory system 8 or due to occurrence of other unpredicted conditions.

Defining the updates for the operating step, i.e., acquiring updated data to execute (or execute again, if necessary) operations 2 and 3, is conveniently carried out by a dedicated neural network, previously trained on the ground.

Step 1.3 is carried out by means of a sensory system, for example in the form of optical sensors, image capture and recognition sensors, etc., after docking, if necessary.

This is for example the case in which the pointing function of an optical instrument on board the captured satellite is to be restored.

Operation 1 is performed at the beginning of the optimisation process and thereafter only if condition 1 described below occurs. Steps 1.1), 1.2, 1.3) and 1.4) have the purpose of initializing (or re-initializing, if necessary) operation 2 and/or of transferring the inputs for operation 3.

Operation 2

Space System Stabilisation

Operation 2 is aimed at carrying out the sub-step FS, i.e. stabilisation of the attitude of the space system 6 in compliance with the requirements of the operating step and with the chosen optimisation criterion, i.e., with the solution of the reduced optimisation problem PR, where the current orientation and positions of the attitude control thrusters 9 are considered constant.

Operation 2 is conveniently carried out by means of a neural network, previously trained on the ground.

The neural network is operated by importing information obtained from operation 1 through steps 1.1, 1.2, 1.3 and 1.4.

Operation 3 is then carried out when the space system 6 is able to meet the requirements of the operating step and the chosen optimisation criterion, for example fuel consumption minimisation.

Operation 3

Acquiring/Updating Inputs for Optimisation of Layout of Attitude Control Thrusters Operation 3 is aimed at preparing the input data, which can be updated during the optimisation process, necessary for carrying out the sub-step RC, i.e., optimising position and orientation of the attitude control thrusters 9.

Operation 3 comprises performing the following steps:
3.1 extracting a subset of attitude control forces and torques applied to the space system 6 during the control steps of the steady operating step FR; and
3.2 determining admissible position and orientation domains of the attitude control thrusters 9 and any updates.

The subset of attitude control forces and torques necessary for the execution of step 3.1 is obtained following an appropriate statistical sampling of the attitude control forces and torques applied to the space system 6 during a sufficiently extended sampling period during the sub-step FR, i.e. steady operation of the space system 6.

For this purpose, the attitude control computer 10 is programmed to extract a subset, of predetermined size, of the resulting forces and torques acting on the space system during the attitude control for a sufficiently extended sampling period during the sub-step FR.

Conveniently, the attitude control computer 10 can be programmed to extract attitude control forces and torques acting on the space system 6 during the most critical attitude control steps of the sub-step FR, and which correspond to, for example, the maximum and minimum values of the modules of the attitude control forces and torques, the maximum required consumption, etc., as well as the attitude control forces and torques acting most frequently on the space system 6 during the sub-step FR.

To ensure that the subset of the extracted attitude control forces and torques is as much representative as possible of those actually acting on the space system 6 during the attitude control steps that take place during the sub-step FR, the attitude control computer 10 can be conveniently programmed to select the attitude control steps that maximise the "total difference" of the attitude control forces and likewise, torques. For this purpose, different formulations can be adopted, for example by maximising, with selected weights, the standard deviation of the forces and moments, the sum of the corresponding distances expressed by means of the L1, L2 norm, etc. Useful techniques and algorithms are available for this purpose, such as "K-means clustering".

Step 3.2 is primarily aimed at identifying the admissible positions and orientations of each attitude control thruster 9, which define the domains of the vectors P and γ in the extended optimisation problem PE. Since this information is not known a priori, as it is unpredictable what exactly the position and orientation of the satellite 5 will be relative to the space tug 1, the admissible positions and orientations for each attitude control thruster 9 are conveniently identified through image recognition techniques.

Step 3.2 has the further purpose of identifying any updates on the availability of the attitude control thrusters 9, which information is necessary for the execution of operation 4. In fact, it might happen, for example, that an attitude control thruster 9 signals a possible malfunction, and in this case it should be suitably replaced by one or different attitude control thrusters 9 that operate in more reliable conditions. A further example may relate to the need of redistributing the use of the attitude control thrusters 9 to avoid overloading some of them. Step 3.2 is also conveniently performed by a neural network previously trained on the ground.

The attitude control forces and torques selected in step 3.1, the identification of the exploitable attitude control thrusters 9 and the definition of the corresponding position and orientation domains computed in step 3.2 are the basic elements for a discretised (small sized) formulation of the extended optimisation problem PE, used in the sub-step RC described thereafter in operation 4.

At the end of execution of operation 3, the attitude control computer 10 is programmed to check occurrence of an operating condition, indicated in the flow chart with the term condition 1 (block 150), which is defined by execution of operation 3 having, or failing to have, resulted in the operating scenario of the space system 6 being varied, in particular having identified a different subset of attitude control forces and torques, or the exclusion of one or more attitude control thrusters 9, compared to the one existing prior to execution of operation 3 in the optimisation process.

If condition 1 is determined to occur, then the attitude control computer 10 is programmed to execute operation 4 described below, otherwise it is designed to repeat operation 1 after a given time period has elapsed (block 160).

During the first execution of operation 3, condition 1 is always determined to have occurred, while in the subsequent iterations condition 1 may not occur, in which case there is no reason to re-execute operation 4, as it would fall into operating scenarios already considered, thus generating possible cycling. Therefore, operation 4 is activated only if condition 1 occurs.

Operation 4

Optimisation of Positions and Orientations of the Attitude Control Thrusters Operation 4 is aimed at optimising positions and orientations of the available attitude control thrusters 9 identified in operation 3, i.e., the computational aspects of sub-step RC, while the output of the sub-step RC, i.e., the movement of the attitude control thrusters 9 is put into practice in operation 5 described thereafter.

In operation 4 the extended optimisation problem PE is solved, where the vectors P and γ, indicative of position and orientation of each attitude control thruster 9, are no longer considered constants, but system parameters (time-independent), which may vary within the related domains identified in operation 3.

The adopted optimisation model/algorithm is inputted (from operation 3) with the representative subset of attitude control forces and torques, the available attitude control thrusters 9, the thrust constraints for each of the available attitude control thrusters 9, as well as any constraints on the time of use, or thrust provided, and/or additional conditions.

It's worth noting that a representative subset of attitude control forces and torques is conveniently adopted, instead of the one including the attitude control forces and torques of all control steps actually sampled, in order to considerably reduce the size (and hence the difficulty) of the extended optimisation problem PE.

The extended optimisation problem PE (discretised according to the subset of selected forces and torques) can be formulated in terms of mathematical programming, with a non-linear, or mixed integer programming (MIP) model and solved with global optimisers (GO) or MIP. Alternatively, the extended optimisation problem PE can be solved via a dedicated neural network, previously trained on the ground (using dedicated models, algorithms, and optimisers),In this case, operations 3 and 4 could be merged into a single operation, carried out by a dedicated neural network, previously trained on the ground.

When operation 4 has been completed, the attitude control computer 10 is programmed to check occurrence of an operating condition, indicated in the flow chart with the term condition 2 (block 170), defined by the solution identified in operation 4 being or failing to be considered better than those identified in the same operation 4 in previous iterations of the process of optimisation of the configuration of the attitude control thrusters 9, based on the considered optimisation criterion.

If, for example, the optimisation criterion is the fuel consumption minimisation, condition 2 is defined by the configuration of the attitude control thrusters 9 identified in operation 4 allowing a fuel saving to be obtained compared to the configurations of the attitude control thrusters 9 identified in the same operation 4 in previous iterations of the process of optimisation of the configuration of the attitude control thrusters 9.

If condition 1 is determined to occur, then the attitude control computer 10 is programmed to execute operation 5 described below, otherwise it is designed to repeat operation 1 after a predefined time period has elapsed (block 160).

Operation 5

(Physically) Modifying Positions and Orientations of the Attitude Control Thrusters Operation 5 is aimed at modifying positions and orientations of the attitude control thrusters 9 based on the outputs of operation 4.

For this purpose, the attitude control computer 10 is programmed to control the movement system 11 to cause the attitude control thrusters 9 to assume the positions and orientations computed in operation 4.

Based on what has been described above it is possible to appreciate the advantages that the present invention allows to achieve.

In particular, the present invention allows an electronic reaction control system to be provided which allows improvements to be obtained both in terms of efficiency of optimisation of fuel consumption of the on-orbit servicing spacecraft and in terms of number of attitude control thrusters needed for controlling attitude of the on-orbit servicing spacecraft and of the space system formed by the on-orbit servicing spacecraft and by the docked or captured space vehicle or object.

The electronic reaction control system can also be used, for example, on a single spacecraft such as a satellite in order to optimise fuel consumption during the different steps of use or in order to optimally redefine the configuration of the attitude control thrusters, in case of failure of one or more of them.

Furthermore, the neural network used may be capable of self-learning by improving its response capacity over time. With the current technological state it is assumed that it could be trained again from the ground with the data sensed during on board use and re-updated through an up-link connection.

The invention claimed is:
1. An on-orbit servicing spacecraft comprising:
an engagement system configured and dimensioned to engage a space vehicle or object so as to form a space system; and
an electronic reaction control system adapted to cause the on-orbit servicing spacecraft to rotate about roll, yaw, and pitch axes to control attitude and displacement of the on-orbit servicing spacecraft along trajectories to cause the on-orbit servicing spacecraft to carry out maneuvers;
the electronic reaction control system comprising:
a sensory system adapted to directly sense physical quantities or indirectly compute physical quantities based on sensed physical quantities comprising one or more of position, attitude, angular rates, available fuel, geometrical features, and on-board system state;
attitude control thrusters mounted so as to allow adjustment of positions and orientations of the attitude control thrusters; and
an attitude control computer in communication with the sensory system and the attitude control thrusters and programmed to receive data from the sensory system and to control, based on the received data, positions, orientations, and operating states of the attitude control thrusters so as to control attitude and position of the on-orbit servicing spacecraft;

wherein the attitude control computer is programmed to cause the on-orbit servicing spacecraft to carry out a mission comprising an engagement step, in which the engagement system and the attitude control thrusters are controlled by the attitude control computer to engage the space vehicle or object, and operating steps, in each of which the attitude control thrusters are controlled by the attitude control computer to meet requirements established for the operating step;
wherein each operating step comprises at least one stabilization sub-step during which an attitude of the space system is stabilized in accordance with the requirements of the operating step and with an optimization criterion;
wherein each stabilization sub-step is followed by a steady operating sub-step, which starts when the stabilization sub-step of the attitude of the space system ends; and
wherein, in each operating step, the attitude control computer is further programmed to optimize a configuration of the attitude control thrusters in accordance with the requirements of the operating step by implementing an iterative process of optimization of the configuration of the attitude control thrusters comprising:
(a) a first operation comprising:
  (i) acquiring and updating the requirements of the operating step and the optimization criterion;
  (ii) acquiring and updating the state of the space system defined by position, orientation, and angular speeds of the space system in a reference system of the space system;
  (iii) determining position and orientation of the engaged space vehicle or object relative to the on-orbit servicing spacecraft so as to allow determination of a geometrical configuration of the space system; and
  (iv) determining positions and orientations of the attitude control thrusters;
(b) a second operation comprising:
  (i) stabilizing the attitude of the space system in compliance with the requirements of the operating step and with the optimization criterion, based on the state and the geometrical configuration of the space system and on the positions and orientations of the attitude control thrusters determined in step (iv) of the first operation;
(c) a third operation comprising:
  (i) determining attitude control forces and torques acting on the space system during a sampling period of the steady operating step; and
  (ii) determining admissible position and orientation domains of the attitude control thrusters and availability of the attitude control thrusters;
(d) a fourth operation comprising:
  (i) optimizing positions and orientations of the attitude control thrusters, based on the optimization criterion and considering the positions and orientations of the attitude control thrusters as system variables that vary within the associated admissible domains determined in step (ii) of the third operation; and
(e) a fifth operation comprising:
  (i) modifying positions and orientations of the attitude control thrusters so as to cause the attitude control thrusters to assume the optimized positions and orientations computed in step (i) of the fourth operation.

2. The on-orbit servicing spacecraft of claim 1, wherein the attitude control computer is further programmed to:
when the third operation has been completed, checking occurrence of a first operating condition defined by execution of the third operation having, or failing to have, resulted in a variation of an operating scenario of the space system defined by a set of attitude control forces and torques applied to the space system or by availability, or lack of availability, of one or more attitude control thrusters compared to an operating scenario prior to execution of the third operation;
if the first operating condition is determined to have occurred, executing the fourth operation; and
if the first operation is determined not to have occurred, initiating the first operation after a time period has elapsed.

3. The on-orbit servicing spacecraft of claim 1, wherein the attitude control computer is further configured to:
when the fourth operation has been completed, checking occurrence of a second operating condition defined by execution of the fourth operation having, or failing to have, resulted in an improvement, determined based on the optimization criterion, compared to a previous execution of the fourth operation;
if the second operation is determined to have occurred, executing the fifth operation; and
if the second operation is determined not to have occurred, initiating the first operation after a time period has elapsed.

4. The on-orbit servicing spacecraft of claim 1, wherein the attitude control computer is further programmed to implement one or more of the stabilization steps associated with the iterative process of optimization, determination of an update need as per step (i) in the first operation, the second operation, and step (ii) in the third operation by means of either one and the same or different neural networks previously trained on ground.

5. The on-orbit servicing spacecraft of claim 1, wherein the attitude control computer is further programmed to determine position and orientation of the space vehicle or object relative to the spacecraft and the geometrical configuration of the space system as set forth in step (iii) of the first operation based on data outputted by the sensory system.

6. The on-orbit servicing spacecraft of claim 1, wherein the attitude control computer is further programmed to execute the third operation when the space system meets the requirements of the operating step and the optimization criterion.

7. The on-orbit servicing spacecraft of claim 1, wherein the attitude control computer is further programmed to execute step (i) of the third operation by extracting a subset of attitude control forces and torques applied to the space system and representative of attitude control forces and torques applied to the space system during control steps during the steady operating step.

8. The on-orbit servicing spacecraft of claim 1, wherein the attitude control computer is further programmed to extract a subset of attitude control forces and torques applied to the space system and comprising attitude control forces and torques applied to the space system during attitude control steps during the steady operating step or attitude control forces and torques applied on the space system during the steady operating step.

9. The on-orbit servicing spacecraft of claim 1, wherein the electronic reaction control system further comprises an electronically-controllable movement system operable to move the attitude control thrusters and comprising:
an electronically-controllable orientation structure configured to support one or different attitude control thrusters so as to allow the one or different attitude control thrusters to rotate about at least two orthogonal rotation axes in response to electrical commands from the attitude control computer;
an electronically-controllable positioning structure designed to support one or different orientation structures so as to allow the one or different orientation structures to translate along a displacement direction in response to electrical commands from the attitude control computer; and
for each electronically-controllable positioning structure, an electronically-controllable deployment structure configured to connect the electronically-controllable positioning structure to the spacecraft and to assume, in response to electrical commands from the attitude control computer, an undeployed configuration in which the electronically-controllable positioning structure is in proximity to the spacecraft, and a deployed configuration, in which the positioning structure is moved away from the spacecraft and brought in a position close to the space vehicle or object.

10. A software loadable in the attitude control computer of the electronic reaction control system of the on-orbit servicing spacecraft of claim 1, wherein the software is programmed to cause, when executed, the attitude control computer to become configured as set forth in claim 1.

* * * * *